C. F. BRADLEY.
ANTISLAP DEVICE FOR PISTONS.
APPLICATION FILED OCT. 2, 1920.
1,393,490.
Patented Oct. 11, 1921.
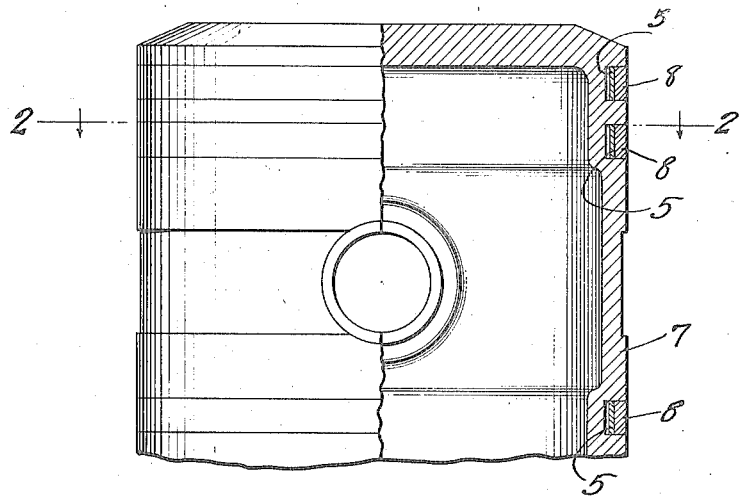
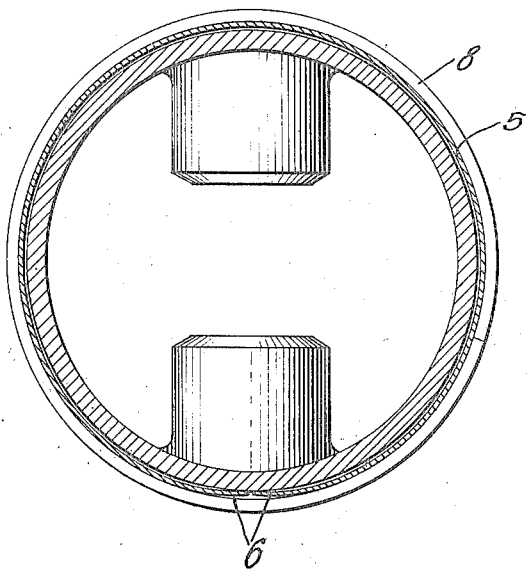
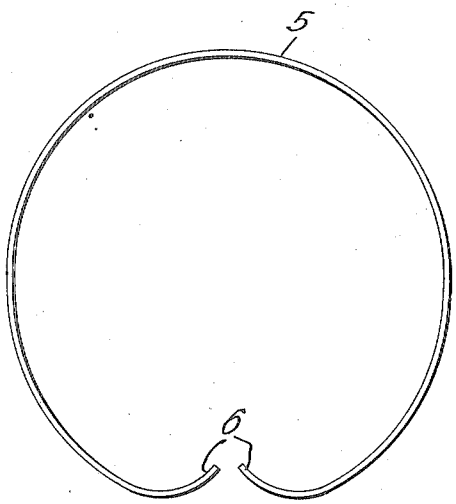
Inventor
Charles F. Bradley
By Norman T. Whitaker
his Attorney

UNITED STATES PATENT OFFICE.

CHARLES F. BRADLEY, OF HOBART, INDIANA.

ANTISLAP DEVICE FOR PISTONS.

1,393,490.  Specification of Letters Patent.  Patented Oct. 11, 1921.

Application filed October 2, 1920. Serial No. 414,229.

*To all whom it may concern:*

Be it known that I, CHARLES F. BRADLEY, a citizen of the United States, and a resident of Hobart, in the county of Lake and State of Indiana, have invented a new and useful Antislap Device for Pistons, of which the following is a specification.

My invention is an anti-slap device for pressure or gas operated pistons, and has as its principal object the provision of a device to be associated with the usual piston ring to, at all times, urge the same against the walls of the cylinder, thereby preventing knocking or slapping of the piston against the cylinder walls.

A further object of the invention is to provide an anti-slap device which may be used in conjunction with pistons and piston rings of usual construction and which will not necessitate enlarging or reconstructing the piston ring grooves.

With the preceding and other objects and advantages in mind, the invention consists in the construction, formation and arrangement of parts to be hereinafter fully defined, claimed and illustrated in the accompanying drawing wherein:

Figure 1 is a fragmentary view of the piston, partly in elevation and partly in vertical cross section and showing several of the devices as used in conjunction with piston rings;

Fig. 2 is a horizontal sectional view taken on line 2—2 of Fig. 1; and

Fig. 3 is an elevation of the anti-slap device removed from the piston ring groove.

The invention as reduced to practice consists of a circular resilient band 5 of uniform width and thickness and fashioned from a length of resilient metal such as ribbon steel. The band 5 has its extremities longitudinally curved inwardly toward each other as indicated at 6 and spaced apart, the curvature of these parts 6 being on an arc greater than the curvature of the major part of the band 5.

The piston, designated at 7, is equipped with the usual one-piece split piston rings 8. In using my device, it is first placed in the piston ring groove with the extremities placed against the rear wall of the latter and the piston ring then engaged in the groove as shown in Figs. 1 and 2 to compress or flex the bowed parts 6. Owing to the normal tendency of the parts 6 to assume the position shown in Fig. 3, and should the piston reach a point in the cylinder where there will be side play, these bowed parts will exert pressure on the piston ring and hold the same against the cylinder wall.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

The combination with a piston provided with a piston ring groove and a piston ring mounted therein, of a substantially circular resilient split band positioned within the piston ring groove behind the piston ring and having its extremities curved inwardly and spaced apart and abutting one wall of the piston ring groove, the bowed parts being normally flexed and adapted, when the piston reaches a point in the cylinder where the piston will have side play, to assume their normal position to move the piston ring against the cylinder to prevent the piston from movement laterally.

CHARLES F. BRADLEY.